United States Patent [19]
Klaffke et al.

[11] 4,172,168
[45] Oct. 23, 1979

[54] LAY-FLAT FLOORING SLAB

[75] Inventors: Friedemann Klaffke, Gorxheimertal; Klaus Heckel, Weinheim, both of Fed. Rep. of Germany

[73] Assignee: Firma Carl Freudenberg, Hohnerweg, Fed. Rep. of Germany

[21] Appl. No.: 918,858

[22] Filed: Jun. 23, 1978

[30] Foreign Application Priority Data

Jul. 5, 1977 [DE] Fed. Rep. of Germany ... 7720993[U]

[51] Int. Cl.² .............................................. B32B 3/26
[52] U.S. Cl. ...................................... 428/138; 428/33; 428/95; 428/143; 428/155; 428/215; 428/315; 428/327
[58] Field of Search ............... 428/17, 33, 95, 143, 428/155, 306, 310, 315, 327, 137, 138, 215

[56] References Cited

U.S. PATENT DOCUMENTS

| 3,511,743 | 5/1970 | Rach | 428/311 |
| 3,616,029 | 10/1971 | Lerman | 428/315 |
| 3,619,343 | 11/1971 | Freeman | 428/142 |
| 3,679,539 | 7/1972 | Gossens et al. | 428/315 |
| 3,682,739 | 8/1972 | Tesch et al. | 428/310 |
| 3,804,699 | 4/1974 | Johnson | 428/314 |
| 3,857,749 | 12/1974 | Yoshida | 428/33 |

FOREIGN PATENT DOCUMENTS

| 2258566 | 6/1974 | Fed. Rep. of Germany | 428/310 |
| 1061702 | 3/1967 | United Kingdom | 428/310 |

*Primary Examiner*—William J. Van Balen
*Attorney, Agent, or Firm*—Sprung, Felfe, Horn, Lynch & Kramer

[57] ABSTRACT

A flat floor tile or slab, especially for use outdoors, comprising a bottom layer of a closed-cell soft foam having openings geometrically distributed over its area and, bonded thereto, a water-permeable covering layer of resiliently cemented-together granules. Advantageously the tile is provided on its periphery with projections and corresponding recesses, whereby said slab can be interlocked with adjacent slabs. The openings in the tile are formed by slits of about 25 mm arranged in parallel straight lines, slits in each line being spaced about 6 mm apart and adjacent lines being spaced less than about 8 mm from one another, the bottom layer comprising a polyethylene foam of a density of about 90 Kp/m³ and a thickness of about 10 mm, the covering layer being about 7 mm thick and comprising irregularly structured granules of an average diameter of about 1 to 5 mm and comprising a mixture of mineral particles and rubber particles.

11 Claims, 2 Drawing Figures

LAY-FLAT FLOORING SLAB

BACKGROUND

The invention relates to a lay-flat flooring slab, especially for outdoor use.

A floor covering built up in two layers for use in sports arenas is disclosed in DT-GM No. 7,620,507, in which the bottom layer, in a foam polyethylene construction, is bonded to a covering layer of resiliently bonded granules of rubber or cork. This floor covering provides entirely satisfactory resilient properties for many applications, but its use outdoors has been impossible for a variety of reasons.

The chief disadvantages of such floor coverings when used out of doors has been that the bottom layer was made entirely waterproof. Consequently, any water from precipitation or in the form of condensation which penetrates into the covering layer cannot pass through the bottom, but builds up in the covering layer, and thus results in a definite impairment of the general resilience. From the physiological point of view, too, this situation is very objectionable.

Another difficulty in the use of such floor coverings is that they necessitate permanent installation. The cleaning of the often wet floor covering, therefore, has to be performed with the covering in place.

THE INVENTION

The invention has the object of modifying a floor covering of the above-described type such that it will be usable outdoors without the above-mentioned disadvantages.

This object is achieved by the invention by means of a lay-flat floor slab which is characterized in that it consists of a bottom layer of a closed-cell soft foam having openings distributed geometrically over the area, to which a water-permeable cover layer of resiliently cemented granules is bonded.

In one advantageous embodiment, it is provided that the openings are formed by slits which are expanded by the transverse stretching of the bottom layer to form gaps. It has been found especially desirable for a plurality of slits to be repeated regularly along imaginary straight lines, the slits of two adjacent lines being in a staggered relationship to one another. With regard to the length of the slits and their distance from one another within a line, values of about 10 to 30 mm have proven especially desirable, preferably a value of about 25 mm. With regard to the distance of the adjacent lines from one another, values of less than 8 mm have proven especially desirable. As regards the thickness of the bottom layer, values of about 5 to 20 mm have proven suitable, preferably a value of about 10 mm.

In one special embodiment, the cover layer consists of irregularly structured granules of an average diameter of one to five millimeters. Particularly suitable are granules of an elastomeric material, preferably rubber. For applications in which the material is subject to great wear, it may also be desirable to use as the granules a mixture of resilient and mineral particles.

The covering layer can be colored in any desired manner. For use in sports arenas, it has been found especially desirable for parts of the covering layer to be composed of differently colored granules so as to constitute boundary markings.

An especially desirable thickness of the covering layer is on the order of magnitude between two and fifteen millimeters. A thickness of about seven millimeters has proven to be especially suitable.

In an additional, especially desirable development, the floor covering slab has in its marginal areas undercut projections and recesses which are so constructed that a similarly shaped adjacent slab can be interlocked with it.

The appended drawing relates to an example of the construction of the flooring slab of the invention.

Figure 1:
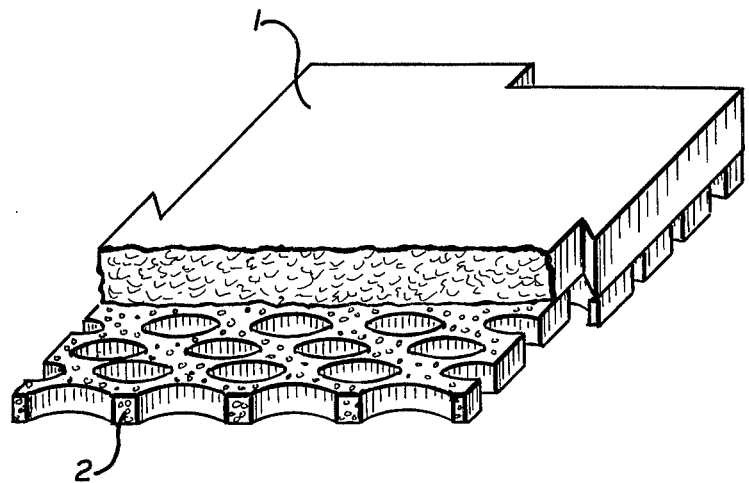
FIG. 1 is a perspective representation of a flooring slab of the invention, which is partially cut away.
Figure 2:
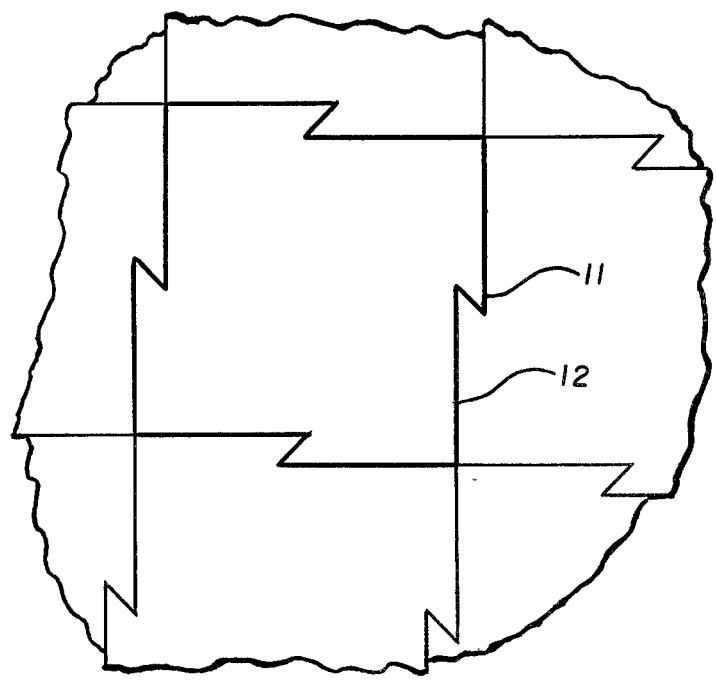
FIG. 2 is a top view of an exemplary construction of the new flooring slab.

The flooring slab of the invention is best produced by independent working procedures whereby the bottom layer 2 and the covering layer 1 are prepared separately.

For the preparation of the covering layer 1, granules of a size of about 2 to 8 mm are preferably used, it being also anticipated, however, that fiber waste and other such materials can be incorporated. The material is uniformly wetted with the binding agent, preferably a polyurethane, and is spread out uniformly by means of a screen to form a flat sheet, it being particularly important to achieve a great homogeneity and at the same time to avoid such compression of the material as might impair its permeability.

For the preparation of the bottom layer 2, first a web of closed-cell soft foam is produced. When a closed-cell, cross-linked polyethylene foam is used, bulk densities of about 50 to 200 kp/m$^3$, and preferably a bulk density of about 90 kp/m$^3$, have proven excellent. The thickness of the web amounts preferably to about 6 mm, and its production is completed by the creation of the drainage openings. For the sake of the uniform permeability of the covering layer, it is desirable for the drainage openings to be disposed as closely together as possible; this can be accomplished, for example, by means of a successive punching method. It is desirable for the punching to be performed such that no material is stamped out of the actual bottom layer, but that only slits are created in the bottom layer. By a simple transverse stretching action, these slits can be expanded to form the openings. A secondary effect resulting therefrom, which must be evaluated in a very positive manner, is that the resilience of the bottom layer can be controlled independently of the variation of the bulk density by controlling this stretching process. The flooring slab of the invention can thus be adapted to widely varying resiliency requirements, and it is not at all difficult to provide it with optimum properties for making a floor covering for a tennis court.

The flooring slab of the invention is preferably not installed permanently, but in the form of individual slabs like the known fleeces. Inasmuch as extremely great point stresses can be produced especially in sports arenas, it may be desirable for the slab to have undercut projections 11 and recesses 12 in its marginal areas whereby a similarly constructed adjacent slab can be interlocked with it. Slabs laid on tamped sand or gravel thus form an extraordinarily tight joint with one another, and the possibility is created, which is often found to be very advantageous, for replacing any damaged or extremely dirty slabs with fresh ones without disturbing the rest of the floor covering.

The advantages achieved by the use of the flooring slab of the invention consist especially in the fact that, on account of its excellent drainage and its complete insensitivity to water, it retains its excellent practical properties for a long period of time. The slab has an excellently controlled resilience, and it is therefore suitable especially for the construction of "do-it-yourself" tennis courts. The expensive maintenance work which formerly was necessary can be almost entirely eliminated by the use of the new material.

In a preferred embodiment, tiles were formed 30 cm square with lines 11 and 12 each 17 cm long. The bottom layer was polyethylene foam of 10 mm thickness and 90 kp/m$^3$ density but slit and expanded to a width of 0,5–1,5 mm. The slits prior to expansion were arranged in straight lines 6 mm apart, the slits being 25 mm long and spaced 6 mm apart from adjacent slits in the same line. There was formed a 7 mm thick covering layer of 3 mm granules made up of rubber particles of about 1 mm ultimate size, the granules being held together by polyurethane.

The expanded bottom and covering layer were then bonded to one another by flame lamination.

It will be appreciated that the instant specification and examples are set forth by way of illustration and not limitation and that various modifications and changes may be made without departing from the spirit and scope of the present invention.

What is claimed is:

1. A lay-flat flooring slab, especially for use outdoors, comprising a bottom layer of a closed-cell soft foam having openings geometrically distributed over its area and formed by slits which are expanded to openings by a transverse stretching and, bonded thereto, a water-permeable covering layer of resiliently cemented-together granules comprising rubber particles.

2. A slab according to claim 1, wherein the slits are arranged in parallel straight lines, the slits of one line being staggered relative to adjacent lines.

3. A slab according to claim 2, wherein each slit and its spacing from adjacent slits within the same line ranges in length from about 10 to 30 mm.

4. A slab according to claim 2, wherein the distance between adjacent lines of slits is less than about 8 mm.

5. A slab according to claim 1, wherein the thickness of the bottom layer ranges from about 5 to 20 mm.

6. A slab according to claim 1, wherein the covering layer comprises irregularly structured granules of an average diameter of 1 to 5 mm.

7. A slab according to claim 6, wherein the granules comprise a mixture of mineral particles and rubber particles.

8. A slab according to claim 1, wherein the covering layer contains boundary markings defined by granules of different colors.

9. A slab according to claim 1, wherein the thickness of the covering layer ranges from about 2 to 15 mm.

10. A slab according to claim 1, provided on its periphery with undercut projections and corresponding recesses, whereby said slab can be interlocked with similarly constructed adjacent slabs.

11. A slab according to claim 10, wherein the openings are formed by slits of about 25 mm arranged in parallel straight lines, slits in each line being spaced about 6 mm apart and adjacent lines being spaced less than about 8 mm from one another, the bottom layer comprising a polyethylene foam of a density of about 90 kp/m$^3$ and a thickness of about 10 mm, the covering layer being about 7 mm thick and comprising irregularly structured granules of an average diameter of about 1 to 5 mm and comprising a mixture of mineral particles and rubber particles.

* * * * *